H. H. SCHILLINGER.
FISH BAIT OR LURE.
APPLICATION FILED MAY 12, 1915.
1,226,701.
Patented May 22, 1917.
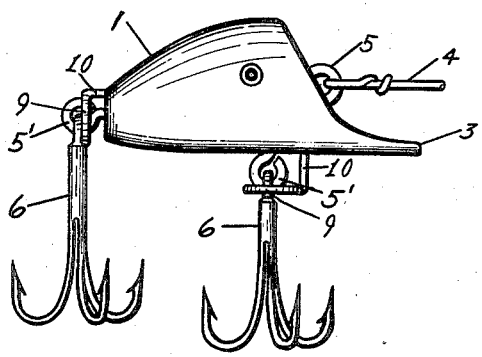
Fig. I.
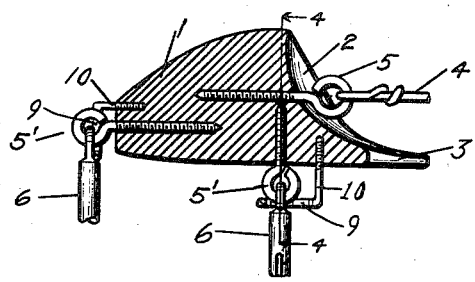
Fig. II.
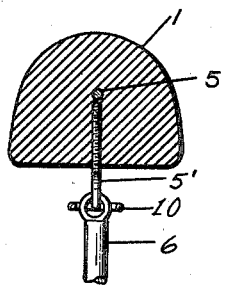
Fig. IV.
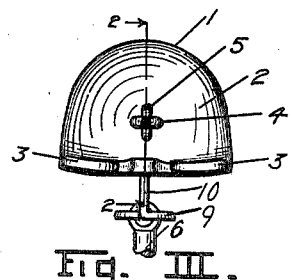
Fig. III.
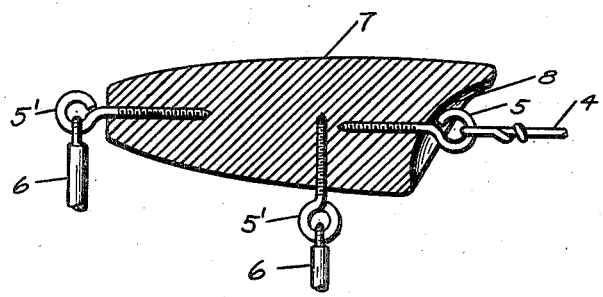
Fig. VI.
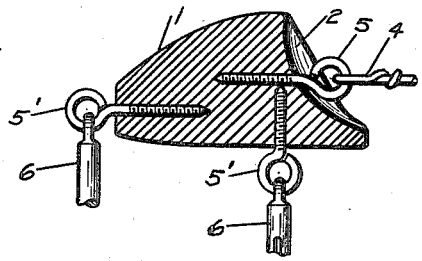
Fig. V.
WITNESSES:
P. M. Pomeroy
Beryl Sanders.
INVENTOR
HENRY H. SCHILLINGER
BY Chappell & Earl
ATTORNEYS

UNITED STATES PATENT OFFICE.

HENRY H. SCHILLINGER, OF PAW PAW, MICHIGAN, ASSIGNOR TO WISE SPORTSMAN'S SUPPLY CO., OF CHICAGO, ILLINOIS, A CORPORATION.

FISH BAIT OR LURE.

1,226,701.  Specification of Letters Patent.  Patented May 22, 1917.

Application filed May 12, 1915. Serial No. 27,628.

*To all whom it may concern:*

Be it known that I, HENRY H. SCHILLINGER, a citizen of the United States, residing at Paw Paw, Michigan, have invented certain new and useful Improvements in Fish Baits or Lures, of which the following is a specification.

This invention relates to improvements in fish baits or lures.

The main object of this invention is to provide an improved fish bait or lure having a vibrating or oscillating movement when drawn through the water, the bait at the same time being simple and economical in structure and easy to operate.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a side elevation of my improved fish bait or lure.

Fig. II is a detail longitudinal central section on a line corresponding to line 2—2 of Fig. III.

Fig. III is a front elevation, the hook being broken away.

Fig. IV is a detail transverse section on a line corresponding to line 4—4 of Fig. II.

Fig. V is a detail longitudinal section of a slightly modified structure in which the blades 3 are omitted.

Fig. VI is a detail longitudinal section of another form of my invention as it is embodied in a surface bait.

In the drawing similar reference characters refer to similar parts throughout the several views, and the sectional views are taken looking in the direction of the little arrows at the ends of the section lines.

Referring to the drawing, the body 1 of my improved bait or lure is rearwardly tapered, its front end in the embodiments shown in Figs. I to V inclusive, being rearwardly inclined. The front end of the bait is of considerable diameter and is provided with a conical recess 2, the diameter of the recess being substantially equal to that of the front end of the body.

In the embodiment shown in Figs. I, II and III, the body is provided with forwardly projecting blades 3 spaced apart as shown in Fig. III. The under side or bottom of the body is preferably flattened and these blades are in substantially the plane of the bottom. The upper surfaces of the blades are curved inwardly, the curvature merging into that of the conical recess 2. The recess is formed so that its bottom in the vertical central longitudinal plane of the body is inclined rearwardly, see Fig. II.

The line attaching eye 5 is disposed centrally of the body in the bottom of the recess. A link 4 is preferably connected to the eye, the line being connected to the link.

Bottom and rear hook attaching eyes 5' are provided for the hooks 6. These eyes 5' and the line attaching eye 5 are, in the structure illustrated, common screw eyes.

In the modified structure shown in Fig. V the blades or wings 3 are omitted.

In the modified structure shown in Fig. VI, in which my improvements are embodied in a surface bait, the body 7 is rearwardly tapered as in Fig. I and is provided with a forwardly inclined front end having a recess 8 therein corresponding to the recess 2 of the embodiment shown in Fig. I.

In the embodiment shown in Figs. I to V inclusive, the bait when drawn through the water will dive below the surface and move forward with an oscillating or vibrating movement, the front end of the body moving in approximately a straight line and the rear end of the body vibrating or oscillating.

In order to accomplish this result it is not necessary that the bait be drawn rapidly through the water, but it takes place when the bait is drawn at moderate speed, which is desirable in attracting the attention of the fish without frightening them and for affording opportunity for the fish to strike the same.

In the embodiment shown in Fig. VI substantially the same movement results with the bait traveling upon the surface of the water.

To limit the swing of the hooks and prevent their fouling with each other and the marring of the body, I provide a hook supporting ring 9 having a laterally disposed shank 10 threaded into the body and supporting the rings so as to limit the swinging of the hooks on their securing eye by engagement with their shanks. The position of the supporting ring determines the swinging of the hooks, that is, the closer it is to the body the greater the swing permitted. For the lower hooks I preferably arrange the supporting ring so that it embraces the eye of the hook shank. For the rear hooks the supporting ring does not embrace the eye of the hook shank but embraces the eye of the attaching screw, constituting a shoulder, however, for limiting the swing of the rear hook and permitting it to normally hang in a substantially vertical position.

I have illustrated and described my improvements in detail in the form preferred by me for surface and under water baits. I have not attempted to illustrate or describe all the modifications which I contemplate as possible and desirable under certain conditions as I believe the disclosure made will enable those skilled in the art to embody my improvements as conditions may render desirable. I desire, however, to be understood as claiming my improvements specifically in the form illustrated, as well as broadly within the scope of the appended claims.

Having thus described my invention, what I claim as new and desire to secure by Letters Patent, is:

1. A fish bait or lure comprising a rearwardly tapered body having a flattened bottom and forwardly projecting spaced blades at the bottom, the front end of the body above the blades being rearwardly inclined and provided with a conical recess, the bottom of the recess in the vertical longitudinal plane of the body being rearwardly inclined, the blades having curved upper surfaces merging into the recess, a line attaching means disposed at the bottom of the recess and centrally of the body, and a suitable hook and hook attaching means.

2. A fish bait or lure comprising a rearwardly tapered body having forwardly projecting spaced blades at the bottom, the front end of the body above the blades being rearwardly inclined and provided with a conical recess, a line attaching means disposed in the recess, and a suitable hook and hook attaching means.

3. A fish bait or lure comprising a body having a forwardly projecting blade at the bottom, the front end of the body above the blade being rearwardly inclined and provided with a conical recess, the bottom of the recess in the vertical longitudinal plane of the body being rearwardly inclined, a line attaching means disposed in the recess, and a suitable hook and hook attaching means.

4. A fish bait or lure comprising a body having a forwardly projecting blade at the bottom, the front end of the body being provided with a conical recess, a line attaching means disposed at the bottom of the recess and centrally of the body, and a suitable hook and hook attaching means.

5. A fish bait or lure comprising a rearwardly tapered body having forwardly projecting spaced blades, the front end of the body above the blades being provided with a conical recess, a line attaching means disposed in the recess, and a suitable hook and hook attaching means.

6. A fish bait or lure comprising a body having a forwardly projecting blade, the front end of the body above the blade being provided with a conical recess, a line attaching means disposed in the recess, and a suitable hook and hook attaching means.

7. A fish bait or lure comprising a rearwardly tapered body having an inclined front end provided with a conical recess, a line attaching means at the bottom of such recess, and a suitable hook and hook attaching means.

8. A fish bait or lure comprising a body having a conical recess in its front end, a line attaching means at the bottom of such recess, and a suitable hook and hook attaching means.

9. A fish bait or lure comprising a rearwardly tapered body, the front end of the body being provided with a conical recess, a line attaching means at the bottom of such recess, and a hook attached to said body.

10. A fish bait or lure, comprising a body having a rearwardly inclined front end provided with a conical recess and having a slot-like opening in the bottom wall of the recess, a line attaching means disposed in the recess, and a suitable hook and hook attaching means.

11. A fish bait or lure comprising a body having a conical recess in its front end and a slot-like opening in the bottom wall of the recess, a line attaching means disposed in the recess, and a suitable hook and hook attaching means.

12. A fish bait or lure comprising a body provided with a conical recess in its front end, a line attaching means disposed at the bottom of the recess and centrally of the body, and a suitable hook and hook attaching means.

13. A fish bait or lure comprising a body provided with a conical recess in its front end of substantial size, a line attaching means disposed in said recess, and a suitable hook and hook attaching means.

In witness whereof, I have hereunto set my hand and seal in the presence of two witnesses.

HENRY H. SCHILLINGER. [L. S.]

Witnesses:
LUELLA G. GREENFIELD,
NELLIE M. HOPKINS.